United States Patent Office

3,153,095
Patented Oct. 13, 1964

3,153,095
PROCESS FOR THE PRODUCTION OF
DIALKYLHYDRAZINES
John B. Tindall, Terre Haute, Ind., assignor to Commercial Solvents Corporation, New York, N.Y., a corporation of Maryland
No Drawing. Filed Nov. 17, 1958, Ser. No. 774,126
9 Claims. (Cl. 260—583)

My invention relates to an improved process for the production of lower N,N-dialkylhydrazines by the catalytic hydrogenation of lower N,N-nitrosodialkylamines, and more particularly, to the destruction of catalyst poisoning impurities by contacting, prior to substantial catalyst inactivation, the lower nitrosodialkylamine with an amine derivative selected from the group consisting of urea, biuret, hydroxylamine, ammonia, and sulfamic acid.

N,N-dialkylhydrazines are generally produced by catalytically hydrogenating solvent solutions of a desired nitrosodialkylamine in the presence of various hydrogenation catalysts. While the process is sound in theory, there are often impurities in the nitrosodialkylamine solutions that poison the catalysts so that little reduction takes place and poor yields are obtained.

These impurities are formed during the production, handling and storage of the nitrosodialkylamines, but not to the same extent in all cases. Some batches of amines never need treatment while others will completely poison the hydrogenation catalyst in about one-half hour.

The catalyst poisoning impurities destroyed in my process cause the release of iodine from potassium iodide and can be cheaply and easily detected by the use of starch-iodine paper which they turn from white to brown or blue in color.

I have now discovered a process for insuring good yields of N,N-dialkylhydrazines which consists of contacting the impurity-containing nitrosodialkylamine solutions with an amine derivative selected from the group consisting of urea, biuret, hydroxylamine, ammonia, and sulfamic acid. The nitrosodialkylamine solutions are preferably treated with the amine derivative prior to contact with the hydrogenation catalyst, as the catalyst is slowly inactivated when the amine derivative treatment is carried out concurrently with hydrogenation.

When it is desired to hydrogenate nitrosodialkylamine solutions containing catalyst-poisoning impurities, small amounts of the amine derivative are incrementally mixed with the nitrosodialkylamine solution. The amine derivative is added to the nitrosodialkylamine solution until the solution no longer colors starch-iodide paper on contact. About 0.05 to about 1.5% urea is generally sufficient to destroy the catalyst-poisoning impurities in the nitrosodialkylamine solutions. After having determined that a nitrosodialkylamine solution contains catalyst-poisoning impurities I generally add from about 0.2 to about 0.5% by weight of the derivative to the impure solution of nitrosodialkylamine prior to retesting the solution with starch-iodide paper, as this amount of amine derivative is generally sufficient to destroy impurities in the great majority of impure solutions. Slight excesses of the described amine derivatives do not increase the time required for hydrogenation or reduce the yields of the various hydrazines.

In continuous plant scale processes where there is no great holdup of the nitrosodialkylamine prior to hydrogenation, I have found that the continual addition of about 0.5 to about 1% by weight of amine derivative, preferably prior to hydrogenation, results in uniformly excellent yields of dialkylhydrazines without the necessity of continual checking of the nitrosodialkylamine with starch-iodide paper.

The amine derivative can be added to nitrosodialkylamine solutions as a solid or in water solution. I prefer to use urea solutions due to the fact that they are inexpensive and can be rapidly mixed with the nitrosodialkylamine which is generally hydrogenated in a water, lower aliphatic alcohol, or hydrocarbon solvent.

The amine derivatives may be added to the lower nitrosodialkylamine solutions which are either acidic of basic in pH but I prefer to add the amine derivative to the solution at acidic pH's, as uniformly better results are obtained.

The lower nitrosodialkylamines which are operative in my process include, for example, N-nitrosodimethylamine, N-nitrosodipropylamine, N-nitroso-N-methylisopropylamine, etc.

The catalysts which I employ in reducing nitrosodialkylamines to the corresponding hydrazines include nickel, platinum, palladium, copper chromite, rhodium, cobalt and iridium. These catalysts may be used as sponge metals, or as solid salts, or can be deposited on any of the usual support materials, such as alumina, silica, barium sulfate, barium chloride, titania, etc. When metals such as platinum and palladium are used on a catalyst support, such as charcoal, sufficient metal is precipitated on the charcoal to comprise about 5 or about 10% of the total catalyst-support weight. Generally, about 0.1 gram to about 1.0 gram of metal per mole of nitrosodialkylamine has been found to be an excellent catalyst when used as a 5% catalyst-charcoal mixture. Generally, I prefer to use palladium or platinum as a 5% deposit on charcoal as these catalysts have been found to give optimum yields under most hydrogenation conditions.

Temperatures ranging from about 15 to about 100° and pressures ranging from about one atmosphere to about 200 atmospheres are useful in hydrogenating the amine derivative-treated nitrosodialkylamines to the corresponding hydrazines. I prefer, however, to carry out the hydrogenation of the nitrosodialkylamines to the corresponding hydrazines at temperatures ranging from about 40 to about 60° C. and at pressures ranging from about 30 to about 40 atmospheres.

The reaction time for the hydrogenation step is a variable dependent upon reaction conditions. In practice, I continue the reaction by applying hydrogen under pressure to the mixture of nitrosodialkylamine and catalyst until cessation of hydrogen absorption occurs, at which time the reaction is complete and the amine derivative-treated nitrosodialkylamine is substantially completely converted to the corresponding N,N-dialkylhydrazine. Upon completion of the reaction, I filter the reaction mixture and recover the N,N-dialkylhydrazine by filtration or fractionation.

The following examples more fully illustrate my invention; however, I do not intend to be limited to the specific materials, proportions, or procedures described. Rather, I intend to include within the scope of my invention all equivalents obvious to those skilled in the art.

*Example I*

To test the effectiveness of my invention, two 500 g. samples of a water solution containing 30% by weight nitrosodimethylamine, which gave blue starch-iodide test, were placed in an 1800 ml. stainless steel rocking bomb containing 0.7 g. of 5% palladium on charcoal catalyst. A five gram portion of urea dissolved in 20 mls. of warm water and five grams of glacial acetic acid were added to the contents of one of the bombs and the bomb was sealed. The bomb was rocked for five minutes during which time it was heated to 40° C. At the end of this time hydrogen was introduced into the rocking bomb until a pressure of 1000 pounds was obtained. The abovedescribed temperature and pressure were maintained in the bomb until hydrogen absorption ceased. The bomb was then vented and the catalyst was filtered from the solution.

The solution to which urea had been added was completely hydrogenated in 12.5 hours and a yield of 85.8% was recovered by salting with $K_2CO_3$, while the untreated solution required 39.5 hours for complete hydrogenation and a yield of only 72.3% was recovered.

*Example II*

Two aliquot 475 ml. samples of a water solution having a pH of 3 containing 1.15 moles of nitrosodiisopropylamine giving a blue starch-iodide test were placed in two 1800 ml. stainless steel rocking bombs. Six grams of urea were added to one of the bombs and 0.7 g. of 5% palladium on charcoal was added to both the bombs. The bombs were sealed and the mixtures hydrogenated as in Example I. The urea-treated solution was hydrogenated in 5.5 hours and a 100% yield was recovered, while the untreated solution required 12.0 hours for complete hydrogenation and gave a yield of 96.7%.

Now having described my invention what I claim is:

1. In a process for the production of lower N,N-dialkylhydrazines by contacting the lower N,N-nitrosodialkylamine with hydrogen in the presence of a hydrogenation catalyst, the step which consists of contacting lower nitrosodialkylamine solutions containing impurities which release iodine from potassium iodide with an amine derivative selected from the group consisting of urea, biuret, hydroxylamine, ammonia, and sulfamic acid.

2. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of an amine derivative selected from the group consisting of urea, biuret, hydroxylamine, ammonia, and sulfamic acid prior to poisoning of the hydrogenation catalyst.

3. The step of claim 2 wherein an amine derivative selected from the group consisting of urea, biuret, hydroxylamine, ammonia, and sulfamic acid is introduced into the impurity containing lower nitrosodialkylamine solution prior to hydrogenation.

4. The step of claim 2 wherein an amine derivative selected from the group consisting of urea, biuret, hydroxylamine, ammonia, and sulfamic acid is incrementally added, prior to hydrogenation, to the lower nitrosodialkylamine solution until no color change occurs when the lower nitrosodialkylamine solution is contacted with starch-iodide paper.

5. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of urea prior to poisoning of the hydrogenation catalyst.

6. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of biuret prior to poisoning of the hydrogenation catalyst.

7. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of hydroxylamine prior to poisoning of the hydrogenation catalyst.

8. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of ammonia prior to poisoning of the hydrogenation catalyst.

9. In a process for the production of lower N,N-dialkylhydrazines by the hydrogenation of lower N,N-nitrosodialkylamine in the presence of a hydrogenation catalyst, the step which consists of contacting an acidic lower nitrosodialkylamine solution containing hydrogenation catalyst poisoning impurities which release iodine from potassium iodide with from about 0.5 to about 1.5% by weight of sulfamic acid prior to poisoning of the hydrogenation catalyst.

References Cited in the file of this patent

UNITED STATES PATENTS

| | | |
|---|---|---|
| 2,166,152 | Howk | July 18, 1939 |
| 2,166,183 | Signiago | July 18, 1939 |
| 2,768,878 | Passino | Oct. 30, 1956 |

FOREIGN PATENTS

| | | |
|---|---|---|
| 1,160,629 | France | Mar. 3, 1958 |
| 797,483 | Great Britain | July 2, 1958 |
| 1,037,464 | Germany | Aug. 28, 1958 |

OTHER REFERENCES

Paal et al.: Berichte Deut. Chem., vol. 63B, pages 57–66 (1930).

Berkman et al.: Catalysis, page 372 (1940).

Fuson et al.: Organic Chemistry, pages 126–7, 190 (2nd ed., 1954).